United States Patent [19]
Gautier et al.

[11] Patent Number: 5,765,468
[45] Date of Patent: Jun. 16, 1998

[54] BOOSTER WITH DEFORMABLE CASING

[75] Inventors: Jean Pierre Gautier; Ulysse Verbo. both of Aulnay-Sous-Bois, France

[73] Assignee: Bosch Systems de Freinage. Drancy, France

[21] Appl. No.: 535,104

[22] PCT Filed: Oct. 12, 1995

[86] PCT No.: PCT/FR95/01328

§ 371 Date: Nov. 13, 1995

§ 102(e) Date: Nov. 13, 1995

[87] PCT Pub. No.: WO96/17760

PCT Pub. Date: Jun. 13, 1996

[30] Foreign Application Priority Data

Dec. 9, 1994 [FR] France ................. 94 14808

[51] Int. Cl.$^6$ .................. F01B 11/02; F15B 9/10
[52] U.S. Cl. .................. 92/169.3; 91/376 R
[58] Field of Search .................. 92/169.1, 169.2, 92/169.3; 91/376 R

[56] References Cited

U.S. PATENT DOCUMENTS

| | | | |
|---|---|---|---|
| 4,402,256 | 9/1983 | Ando | 92/169.3 X |
| 4,418,611 | 12/1983 | Tateoka et al. | 92/169.3 X |
| 4,433,614 | 2/1984 | Takeucki et al. | 92/169.3 X |
| 5,410,880 | 5/1995 | Schluter | 92/169.3 X |
| 5,447,030 | 9/1995 | Wang et al. | 92/169.3 X |

FOREIGN PATENT DOCUMENTS

| | | |
|---|---|---|
| 331535 | 9/1989 | European Pat. Off. . |
| 2440295 | 5/1990 | France . |

*Primary Examiner*—Hoang Nguyen
*Attorney, Agent, or Firm*—Leo H. McCormick, Jr.; Warren Comstock

[57] ABSTRACT

A pneumatic brake booster for a motor vehicle having a rigid casing (1) with a first shell (10) which points toward the front of the vehicle and a second shell (11) which points toward the rear of the vehicle. At least one through bolt (5) fastened to the front shell (10) and rear shell (11) by respective cohesive forces which joins the front shell (10) to the rear shell (11) in an axial direction by a compressive force which tends to pull the front shell (10) toward the rear shell (11). The cohesive force between the through bolt (5) and the front shell (10) wholly consists of an elastic force exerted by the rigid casing (1) on the through bolt (5) in reaction to the compressive force exerted on the front shell (10) and rear shell (11) by the through bolt (5). The through bolt (5) has a threaded end (50) which passes through the front shell (10). The through bolt (5) and front shell (10) are held together by the sole effect of a nut (6) which is screwed onto the end (50) of the through bolt (5) outside of the front shell (10). Should an impact force be applied to the front shell, the front shell (10) deform by independently moving and absorpting kinetic energy associated with the impact force to substantially eliminating the transmitting forces a driver of the vehicle as the through bolt remains stationary.

1 Claim, 1 Drawing Sheet

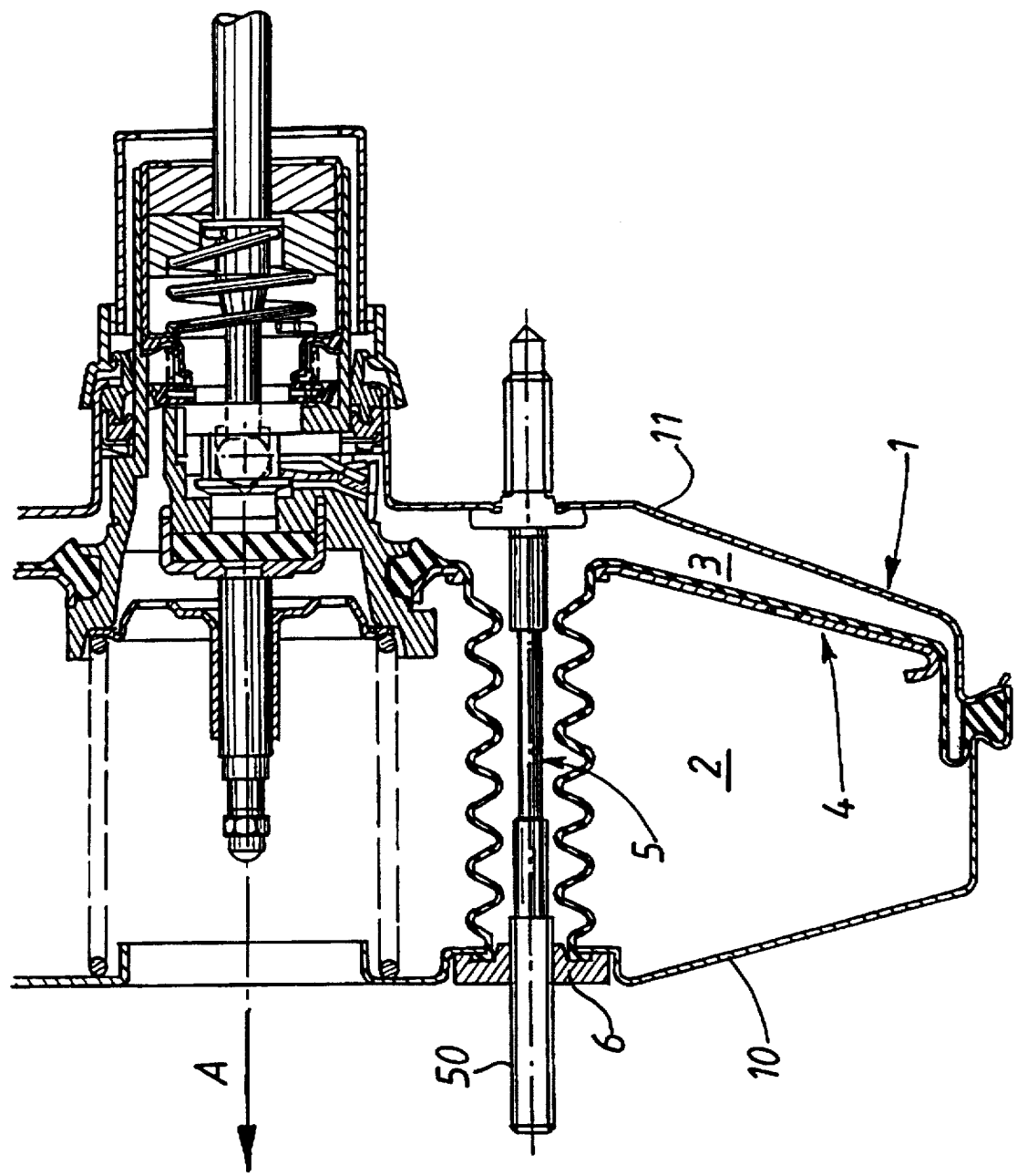

5,765,468

BOOSTER WITH DEFORMABLE CASING

The present invention relates to a pneumatic brake booster for a motor vehicle, comprising a rigid casing separated into at least one front chamber and one rear chamber by means of a movable partition, the casing comprising a front shell forming a wall for the front chamber and pointing towards the front of the vehicle, and a rear shell forming a wall for the rear chamber and pointing towards the rear of this vehicle, this booster further comprising at least one through bolt fastened to the first and second shells by respective cohesive forces and joining these two shells together in an axial direction in order to exert on them a compressive force which tends to pull them together the cohesive force between the through bolt and the front shell wholly consisting of an elastic force exerted by the rigid casing on this through bolt in reaction to the compressive force exerted on the shells by this through bolt.

Boosters of this type are known in the prior art, and a particular example thereof is given in the Patent EP-B-0, 331,535.

The invention proposed is based on the demonstration of the fact that boosters with through bolts, although offering the advantage of exhibiting highly satisfactory overall rigidity for relatively slight thickness of the casing, also exhibit the drawback of being able to transmit very substantial forces to the driver in the event of accidental frontal impact of the vehicle, and the object of the invention consists precisely in reconciling the advantages and disadvantages of this type of booster.

By virtue of this arrangement not only can the front shell of the booster, in the event of impact, deform without transmitting substantial forces to the driver through the through bolt or through bolts, but it even allows, in deforming, the absorption of kinetic energy the amount of which may be controlled by screwing the nut onto the through bolt.

To this end, the booster of the invention is essentially characterized in that the through bolt has a threaded end passing through the front shell, and the through bolt and front shell are joined together by the sole effect of a nut screwed onto the end of the through bolt on the outside of the front shell.

Other features and advantages of the invention will emerge clearly from the description thereof which is given hereafter by way of non-limiting indication with reference to the single FIGURE which is a view in partial section of a booster in accordance with the invention.

As this FIGURE shows, the invention relates to a pneumatic brake booster for a motor vehicle, comprising a rigid casing 1 separated into at least one front chamber 2 and one rear chamber 3 by means of a movable partition 4.

More precisely, the casing 1 comprises a first shell 10 forming a wall for the front chamber and pointing towards the front of the vehicle, and a second shell 11 forming a wall for the rear chamber 3 and pointing towards the rear of this vehicle.

The shells 10, 11 are crimped onto one another and joined together by at least one and preferably two through bolts, such as 5, these through bolts pointing in an axial direction A and being designed to exert on the shells 10, 11 a compressive force which tends to pull them together and press them against each other.

Each through bolt is fastened to the first and second shells by respective cohesive forces, these cohesive forces being defined as those which have to be overcome in order to detach this through bolt relative to the respective shells, and the, cohesive force between the, or at least one, through bolt 5 and front shell 10 wholly consisting of an elastic force exerted by the rigid casing 1 on this through bolt in reaction to the compressive load exerted by this through bolt on the shells 10, 11 in the axial direction A.

To this end, it is possible, for example, to envisage the through bolt 5 having a threaded end 50 passing through the front shell 10, and the through bolt 5 and the front shell 10 being secured together by the sole effect of a nut 6 screwed onto the end 50 of the through bolt on the outside of the front shell 10.

We claim:

1. A pneumatic brake booster for a motor vehicle, comprising a rigid casing separated into at least a first front chamber and a first rear chamber by means of a movable partition, said casing comprising a front shell forming a wall for said first front chamber and pointing towards the front of the vehicle, and a rear shell forming a wall for said first rear chamber and pointing towards the rear of the vehicle, said booster further having at least one through bolt fastened to said front and rear shells by respective cohesive forces and joining together said front shell to said rear shell in an axial direction by exerting a compressive force which tends to pull said front shell toward said rear shell, a cohesive force developed between said through bolt and said front shell and wholly consists of an elastic force exerted by the rigid casing on said through bolt in reaction to said compressive force exerted on the shells by said through bolt, characterized in that said through bolt has a threaded end which freely passes through an opening in said front shell and in that said through bolt and the front shell are held together by the sole effect of said compressive developed force as a nut is screwed onto said end of said through bolt outside the front shell which engages said front shell to allow said front shell to freely moved toward said rear shell, said front shell responding to an impact force by deforming to absorping substantially all kinetic energy associated with said impact force, said front shell in deforming independently moving while said through bolt remains stationary to substantially eliminate the transmission of the impact force to an operator.

* * * * *